(12) United States Patent
Song et al.

(10) Patent No.: US 11,233,257 B2
(45) Date of Patent: Jan. 25, 2022

(54) METHODS AND SYSTEM FOR A BATTERY

(71) Applicant: ESS TECH, INC., Wilsonville, OR (US)

(72) Inventors: Yang Song, West Linn, OR (US); Evan Doremus, Portland, OR (US)

(73) Assignee: ESS TECH, INC., Wilsonville, OR (US)

( * ) Notice: Subject to any disclaimer, the term of this patent is extended or adjusted under 35 U.S.C. 154(b) by 716 days.

(21) Appl. No.: 15/965,673

(22) Filed: Apr. 27, 2018

(65) Prior Publication Data
US 2018/0316031 A1 Nov. 1, 2018

Related U.S. Application Data

(60) Provisional application No. 62/491,954, filed on Apr. 28, 2017.

(51) Int. Cl.
*H01M 8/04746* (2016.01)
*H01M 8/18* (2006.01)
(Continued)

(52) U.S. Cl.
CPC ....... *H01M 8/04753* (2013.01); *H01M 8/043* (2016.02); *H01M 8/04201* (2013.01);
(Continued)

(58) Field of Classification Search
CPC .... H01M 8/043; H01M 8/04201; H01M 8/18; H01M 8/188; H01M 8/2455
See application file for complete search history.

(56) References Cited

U.S. PATENT DOCUMENTS 6,692,862 B1   2/2004   Zocchi
7,800,345 B2   9/2010   Yun et al.
(Continued)

FOREIGN PATENT DOCUMENTS

JP    H1131522 A       2/1999
JP    2006012425 A  *  1/2006
(Continued)

OTHER PUBLICATIONS

JP2006012425A Translation from Espacenet (Year: 2006).*
(Continued)

*Primary Examiner* — Nathanael T Zemui
(74) *Attorney, Agent, or Firm* — McCoy Russell LLP

(57) ABSTRACT

Systems and methods for operating a redox flow battery system may include switching the redox flow battery system to an idle mode, wherein the idle mode includes operation of the redox flow battery system outside of a charging mode and outside of a discharge mode; in response to switching to the idle mode, repeatedly cycling operation of an electrolyte pump between an idling threshold flow rate less than a charging threshold flow rate and a deactivation threshold flow rate; and in response to switching to the charging mode, maintaining operation of the electrolyte pump at the charging threshold flow rate greater than the idling threshold flow rate. In this way, a responsiveness of the redox flow battery system to charging and discharging commands can be maintained while in idle, while reducing parasitic pumping losses due to pumping and heating, and reducing shunt current losses.

18 Claims, 8 Drawing Sheets

(51) Int. Cl.
*H01M 8/04082* (2016.01)
*H01M 8/043* (2016.01)
*H01M 8/2455* (2016.01)

(52) U.S. Cl.
CPC ............ *H01M 8/18* (2013.01); *H01M 8/188* (2013.01); *H01M 8/2455* (2013.01); *Y02E 60/50* (2013.01)

(56) References Cited

U.S. PATENT DOCUMENTS

| | | | |
|---|---|---|---|
| 9,509,011 B2 | 11/2016 | Evans et al. | |
| 2013/0011704 A1* | 1/2013 | Horne | H01M 8/04186 429/72 |
| 2013/0157087 A1* | 6/2013 | Pandy | H01M 8/04303 429/51 |
| 2014/0060666 A1* | 3/2014 | Evans | H01M 50/60 137/260 |
| 2015/0255824 A1 | 9/2015 | Evans et al. | |
| 2016/0006054 A1 | 1/2016 | Li et al. | |
| 2016/0093925 A1 | 3/2016 | Li et al. | |
| 2016/0293992 A1 | 10/2016 | Song et al. | |
| 2016/0372776 A1* | 12/2016 | Hsieh | H01M 8/188 |
| 2017/0033391 A1* | 2/2017 | Kumamoto | H01M 8/188 |

FOREIGN PATENT DOCUMENTS

| | | |
|---|---|---|
| JP | 2006012425 A | 1/2006 |
| KR | 20150103198 A | 9/2015 |
| WO | 2013027076 A1 | 2/2013 |
| WO | 2016117265 A1 | 7/2016 |

OTHER PUBLICATIONS

Song, Y. et al., "Methods and Systems for Operating a Redox Flow Battery System," U.S. Appl. No. 15/965,709, filed Apr. 27, 2018, 44 pages.

Evans, C., "Methods and Systems for Rebalancing Electrolytes for a Redox Flow Battery System," U.S. Appl. No. 15/965,728, filed Apr. 27, 2018, 50 pages.

Song, Y. et al., "Integrated Hydrogen Recycle System Using Pressurized Multichamber Tank," U.S. Appl. No. 15/965,627, filed Apr. 27, 2018, 50 pages.

Song, Y. et al., "Methods and Systems for Redox Flow Battery Electrolyte Hydration," U.S. Appl. No. 15/965,671, filed Apr. 27, 2018, 56 pages.

Song, Y. et al., "Flow Battery Cleansing Cycle To Maintain Electrolyte Health and System Performance," U.S. Appl. No. 15/965,722, filed Apr. 27, 2018, 56 pages.

ISA Korean Intellectual Property Office, International Search Report Issued in Application No. PCT/US2018/030007, dated Aug. 27, 2018, WIPO, 2 pages.

* cited by examiner

METHODS AND SYSTEM FOR A BATTERY

CROSS REFERENCE TO RELATED APPLICATIONS

The present application claims priority to U.S. Provisional Application No. 62/491,954, entitled "Methods and System for a Battery", and filed on Apr. 28, 2017. The entire contents of the above-listed application are hereby incorporated by reference for all purposes.

ACKNOWLEDGMENT OF GOVERNMENT SUPPORT

This invention was made with government support under contract no. DEAR0000261 awarded by the DOE, Office of ARPA-E. The government has certain rights in the invention.

FIELD

The present description relates generally to a redox flow battery system and methods of operating redox flow battery systems.

BACKGROUND AND SUMMARY

Redox flow batteries are suitable for grid scale storage applications due to their capabilities of scaling power and capacity independently, and charging and discharging for thousands of cycles with minimal performance losses. While idle and not actively charging or discharging, redox flow battery systems typically maintain electrolyte temperatures at charging/discharging levels, and continue pumping of electrolytes at charging/discharging flow rates in order to sustain a readiness of the system to supply power in response to a charge or discharge command.

However, the inventors herein have recognized potential issues with such systems. Namely, a flow battery in a charged state can lose its energy storage capacity much faster than a traditional battery in the same charged state, while sustaining idle mode. In particular, flow battery systems can lose capacity by way of shunt current losses through the conductive electrolytes and from ionic movement through the membrane. Continuously cycling fresh electrolyte to the battery cells, such as during idle operation of the flow battery, can maintain these shunting losses at higher levels. Furthermore, the redox flow battery system may suffer from parasitic power losses due to continuous pumping and heating of the electrolyte at charging/discharging levels during the idle state, including pumping parasitic loss and heating parasitic loss.

In one embodiment, the issues described above may be at least partially addressed by a method of operating a redox flow battery system, comprising switching the redox flow battery system to an idle mode, wherein the idle mode includes operation of the redox flow battery system outside of a charging mode and outside of a discharge mode. Furthermore, the method may include in response to switching to the idle mode, repeatedly cycling operation of an electrolyte pump between an idling threshold flow rate less than a charging threshold flow rate and a deactivation threshold flow rate, and in response to switching to the charging mode, maintaining operation of the electrolyte pump at the charging threshold flow rate.

In another embodiment, a method of operating a redox flow battery system may comprise, operating the redox flow battery system in an idle mode during a condition when the redox flow battery system is operating outside of a charging mode and outside of a discharge mode. Furthermore, during operation in the idle mode, the method may include repeatedly cycling operation of an electrolyte pump between an active state and an inactive state, wherein the active state comprises pumping electrolyte at an idling threshold flow rate less than a charging threshold flow rate, and the inactive state comprises deactivating the electrolyte pump and decreasing a heater set point. Further still, in response to switching to the discharge mode, the method may include maintaining operation of the electrolyte pump at the discharge threshold flow rate.

In another embodiment a redox flow battery system may comprise a power module, including a plurality of redox flow battery cell stacks each of the redox flow battery cell stacks including a redox flow battery cell, an electrolyte pump capable of delivering electrolyte from an electrolyte tank to the power module, and a power control system with a controller. The controller may include executable instructions thereon to, switch the redox flow battery system to an idle mode, wherein the idle mode includes operation of the redox flow battery system outside of a charging mode and outside of a discharge mode; in response to switching to the idle mode, repeatedly cycling operation of the electrolyte pump between an idling threshold flow rate less than a charging threshold flow rate and a deactivation threshold flow rate; and in response to switching to the charging mode, maintaining operation of the electrolyte pump at the charging threshold flow rate.

In this way, the technical effect can be achieved of maintaining a responsiveness of the redox flow battery system to charging and discharging commands while in idle, while reducing parasitic power losses due to pumping and heating, and reducing shunt current losses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
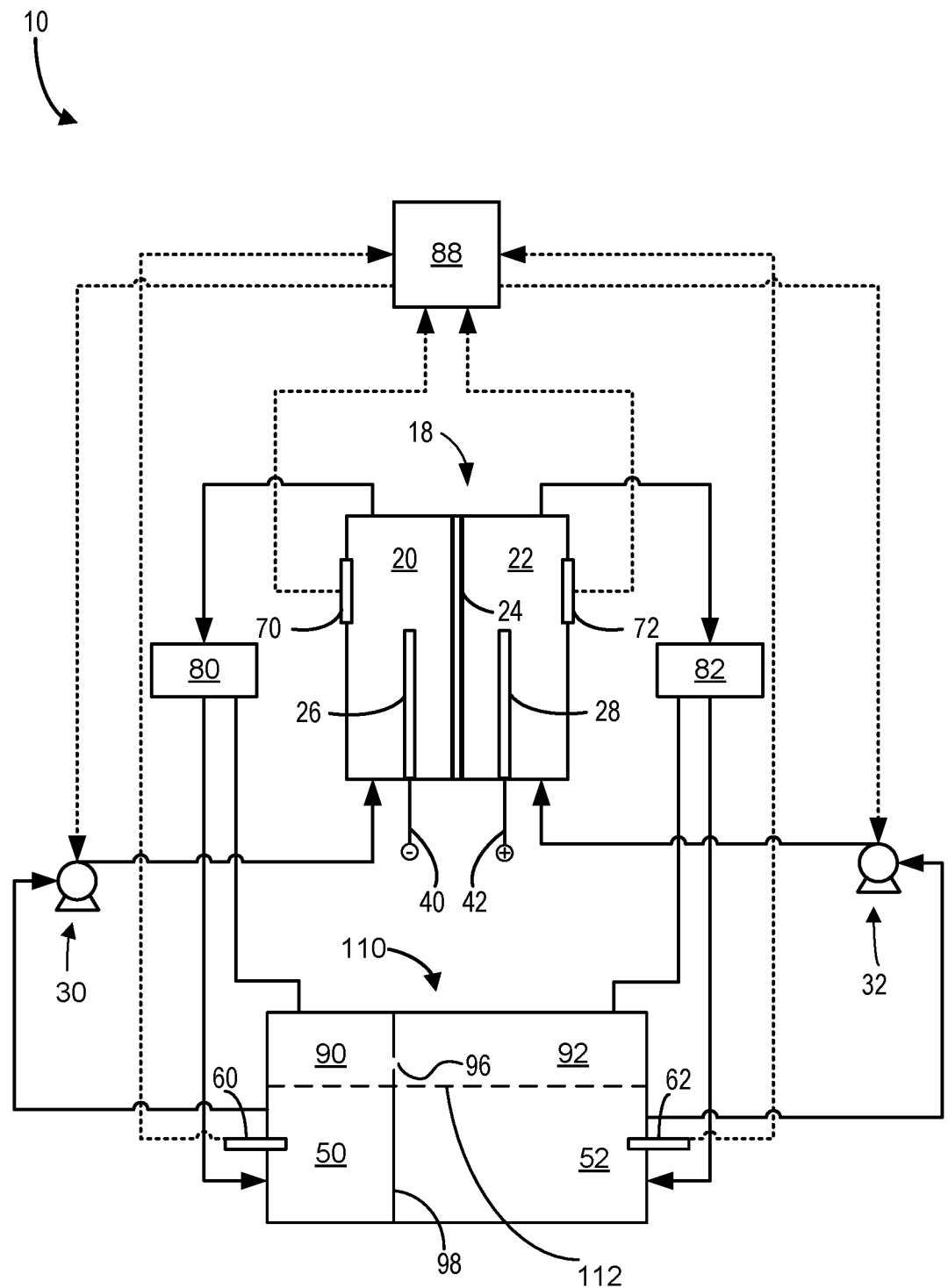
FIG. 1 shows a schematic of an example redox flow battery system.

The following description relates to systems and method for a redox flow battery.

Hybrid redox flow batteries are redox flow batteries that are characterized by the deposit of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a redox flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$: The electrochemical reaction is summarized in equations (1) and (2), wherein the forward reactions (left to right) indicate electrochemical reactions during battery charge, while the reverse reactions (right to left) indicate electrochemical reactions during battery discharge:

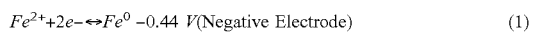

$$Fe^{2+}+2e-\leftrightarrow Fe^0 \ -0.44 \ V\text{(Negative Electrode)} \qquad (1)$$

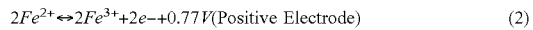

$$2Fe^{2+}\leftrightarrow 2Fe^{3+}+2e-+0.77V\text{(Positive Electrode)} \qquad (2)$$

As discussed above, the negative electrolyte used in the all iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the negative electrode.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as positive electrolyte chamber 52 or an external positive electrolyte storage tank. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as negative electrolyte chamber 50 or an external negative electrolyte storage tank to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of Fe(OH)$_3$. Precipitation of Fe(OH)$_3$ can damage the separator 24 and cause permanent battery performance and efficiency losses. For example, Fe(OH)$_3$ precipitate may chemically foul the organic functional group of an ion-exchange membrane or physically clog the small micro-pores of an ion-exchange membrane. In either case, due to the Fe(OH)$_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of H+ (e.g., protons) and subsequent formation of H2 (e.g., hydrogen gas), and the reaction of protons in the negative electrode compartment 20 with electrons supplied at the plated iron metal electrode to form hydrogen gas.

The IFB electrolyte (e.g., FeCl$_2$, FeCl$_3$, FeSO$_4$, Fe2(SO$_4$)$_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

FIG. 1 provides a schematic illustration of a redox flow battery system 10. The redox flow battery system 10 may comprise a redox flow battery cell 18 fluidly connected to a multi-chambered electrolyte storage tank 110. The redox flow battery cell 18 may generally include a negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise a negative electrode 26, and a negative electrolyte comprising electroactive materials. The positive electrode compartment 22 may comprise a positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are pumps 30 and 32, both used to pump electrolyte solution through the flow battery system 10. Electrolytes are stored in one or more tanks external to the cell, and are pumped via pumps 30 and 32 through the negative electrode compartment 20 side and the positive electrode compartment 22 side of the battery, respectively.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise an integrated multi-chambered electrolyte storage tank 110. The multi-chambered electrolyte storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered electrolyte storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered electrolyte storage tank 110 with returning electrolyte from the redox flow battery cell 18. The hydrogen gas may be separated spontaneously at the gas-liquid interface (e.g., fill height 112) within the multi-chambered electrolyte storage tank 110, thereby precluding having additional gas-liquid separators as part of the redox flow battery system. Once separated from the electrolyte, the hydrogen gas may fill the gas head spaces 90 and 92. As such, the stored hydrogen gas can aid in purging other gases from the multi-chambered electrolyte storage tank 110, thereby acting as an inert gas blanket for reducing oxidation of electrolyte species, which can help to reduce redox flow battery capacity losses. In this way, utilizing the integrated multi-chambered electrolyte storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned at a threshold height above the fill height 112. The spill over hole further enables a capability to self-balance the electrolytes in each of the positive and negative electrolyte chambers 52 and 50 in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered electrolyte storage tank 110 to maintain a continuously pressurized state without leaks. The multi-chambered electrolyte storage tank 110 can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level. Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further illustrated in FIG. 1, electrolyte solutions typically stored in the multi-chambered electrolyte storage tank 110 are pumped via pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence a packed catalyst bed.

During operation of a redox flow battery system, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. Sensors may be positioned at other locations throughout the redox flow battery system to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system 10. Sensor information may be transmitted to a controller 88 which may in turn actuate pumps 30 and 32 to control electrolyte flow through the cell 18, or to perform other control functions, as an example. In this manner, the controller 88 may be responsive to, one or a combination of sensors and probes.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110.

The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure. In response to the pH increase, controller 88 may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

Figure 2:
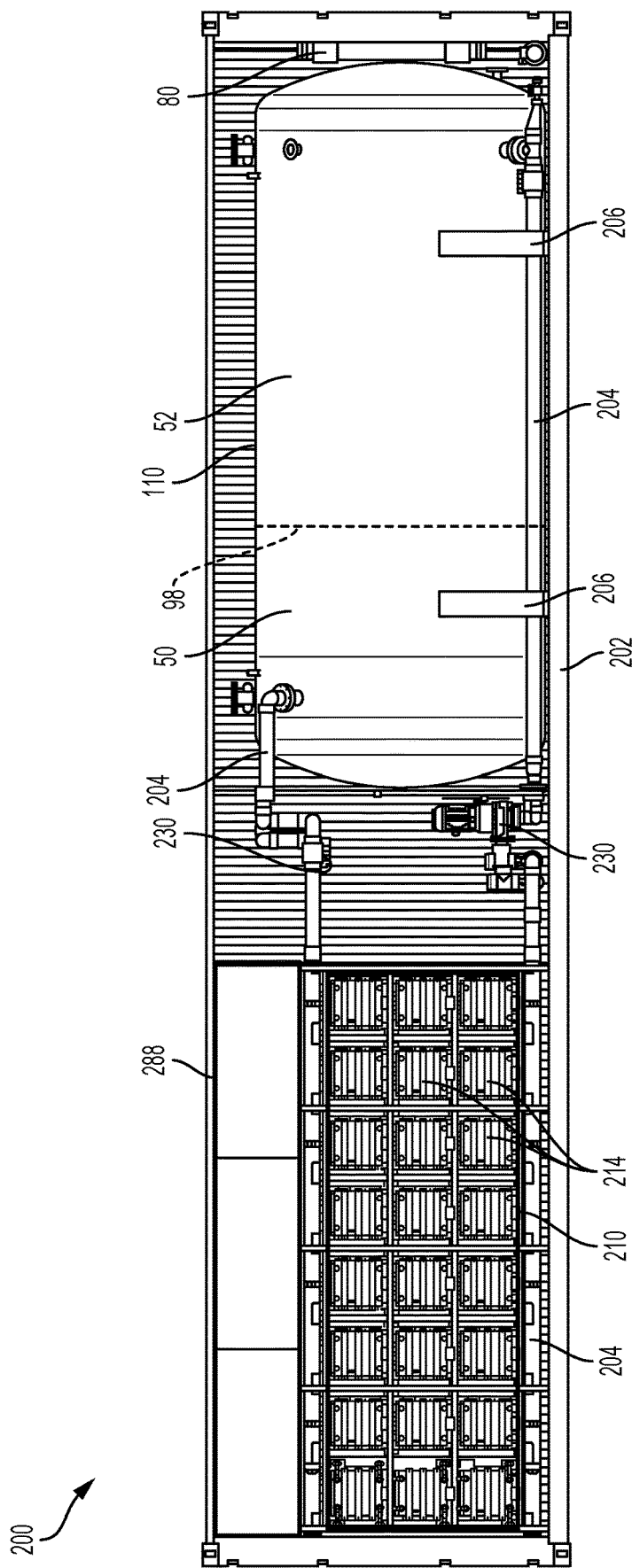
FIG. 2 shows a side view of an example layout for the redox flow battery system of FIG. 1.

Turning now to FIG. 2, it illustrates a side view of an example redox flow battery system layout 200 for the redox flow battery system 10. Redox flow battery system layout may be housed within a housing 202 that facilitates long-distance transport and delivery of the redox flow battery system. In some examples, the housing 202 can include a standard steel freight container or a freight trailer that can be transported via rail, truck or ship. The system layout 200 can include the integrated multi-chambered electrolyte storage tank 110 and rebalancing reactors 80 positioned at a first side of the housing 202, and a power module 210, and power control system (PCS) 288 at a second side of the housing 202. Auxiliary components such as supports 206, as well as various piping 204, pumps 230, valves (not shown), and the like may be included within the housing 202 (as further described with reference to FIG. 1) for stabilizing and fluidly connecting the various components positioned therein. For example, one or more pumps 230 may be utilized to convey electrolyte from the integrated multi-chambered electrolyte storage tank 110 to one or more battery cell stacks 214 within the power module 210. Furthermore additional pumps 230 may be utilized to return electrolyte from the power module 210 to the negative electrolyte chamber 50 or the positive electrolyte chamber 52 of the integrated multi-chambered electrolyte storage tank 110.

Power module 210 may comprise one or more redox flow battery cell stacks 214 electrically connected in parallel and/or in series. Each of the redox flow battery cell stacks 214 may further comprise a plurality of redox flow battery cells 18 connected in parallel and/or series. In this way, power module 210 may be able to supply a range of current and/or voltages to external loads. The PCS 288 includes controller 88, as well as other electronics, for controlling and monitoring operation of the redox flow battery system 10. Furthermore, PCS 288 may regulate and monitor voltage supplied to external loads, as well as supplying current and/or voltage from external sources for charging of the power module 210. The PCS 288 may further regulate and control operation of the redox flow battery system during an idle state. The redox flow battery system being in an idle state may include when the power module 210 is not in charge mode or discharge mode. As an example, the power module 210 may be in charge mode when an external voltage or current is supplied to one or more redox flow battery cells of the power module 210 resulting in reduction of electrolyte and plating of the reduced electrolyte at the negative electrode of the one or more redox flow battery cells. For the case of an IFB, ferrous ion may be reduced at the plating electrode of one or more redox flow battery cells, thereby plating iron thereat during charging of the power module. As another example, the power module 210 may be in a discharge mode when voltage or current is supplied from one or more redox flow battery cells of the power module 210 resulting in oxidation of plated metal at the negative electrode resulting in deplating (e.g., loss of metal) and solubilizing of the oxidize metal ions. For the case of an IFB, iron may be oxidized at the plating electrode of one or more redox flow battery cells, thereby solubilizing ferrous ion thereat during discharging of the power module. Further details regarding conditions for entering and exiting the charge and discharge modes of the redox flow battery system are described with reference to FIGS. 3-5 below.

Figure 3:
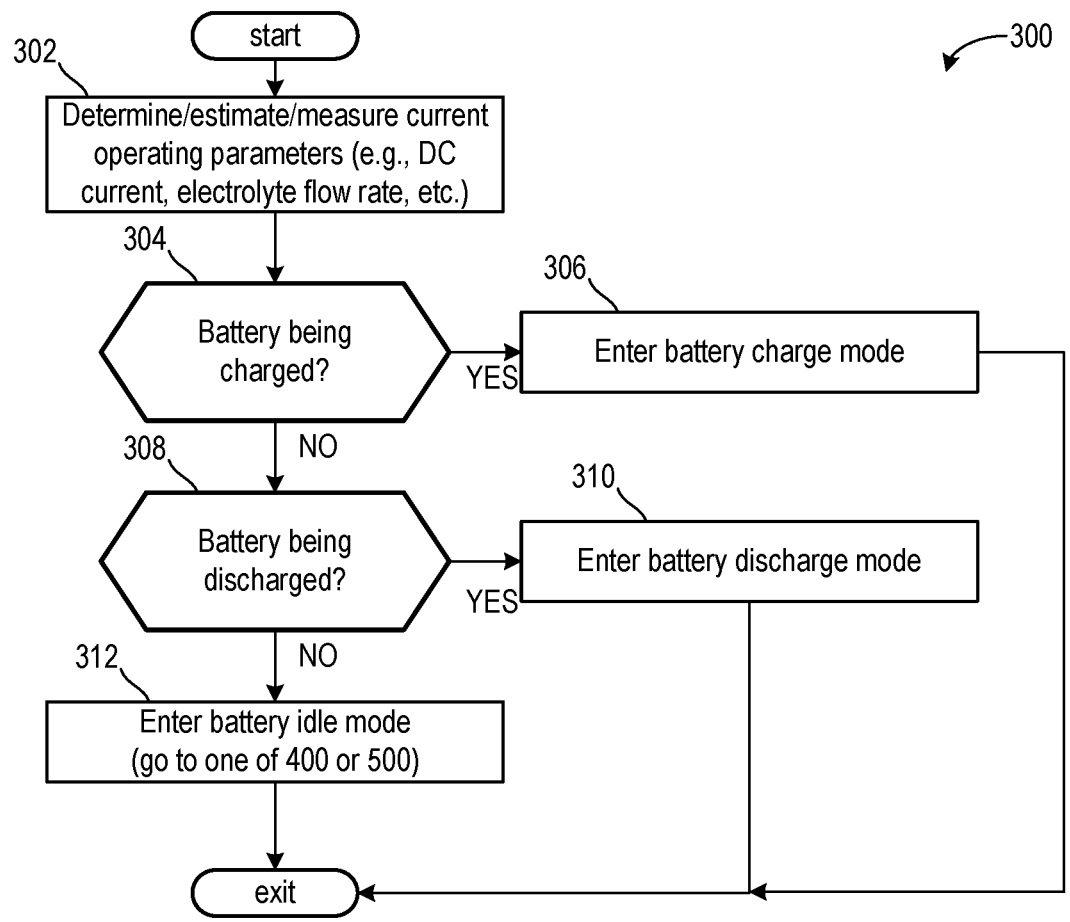
FIG. 3 shows a high level flow chart of an example method for operating the redox flow battery system of FIG. 1.
Figure 4:
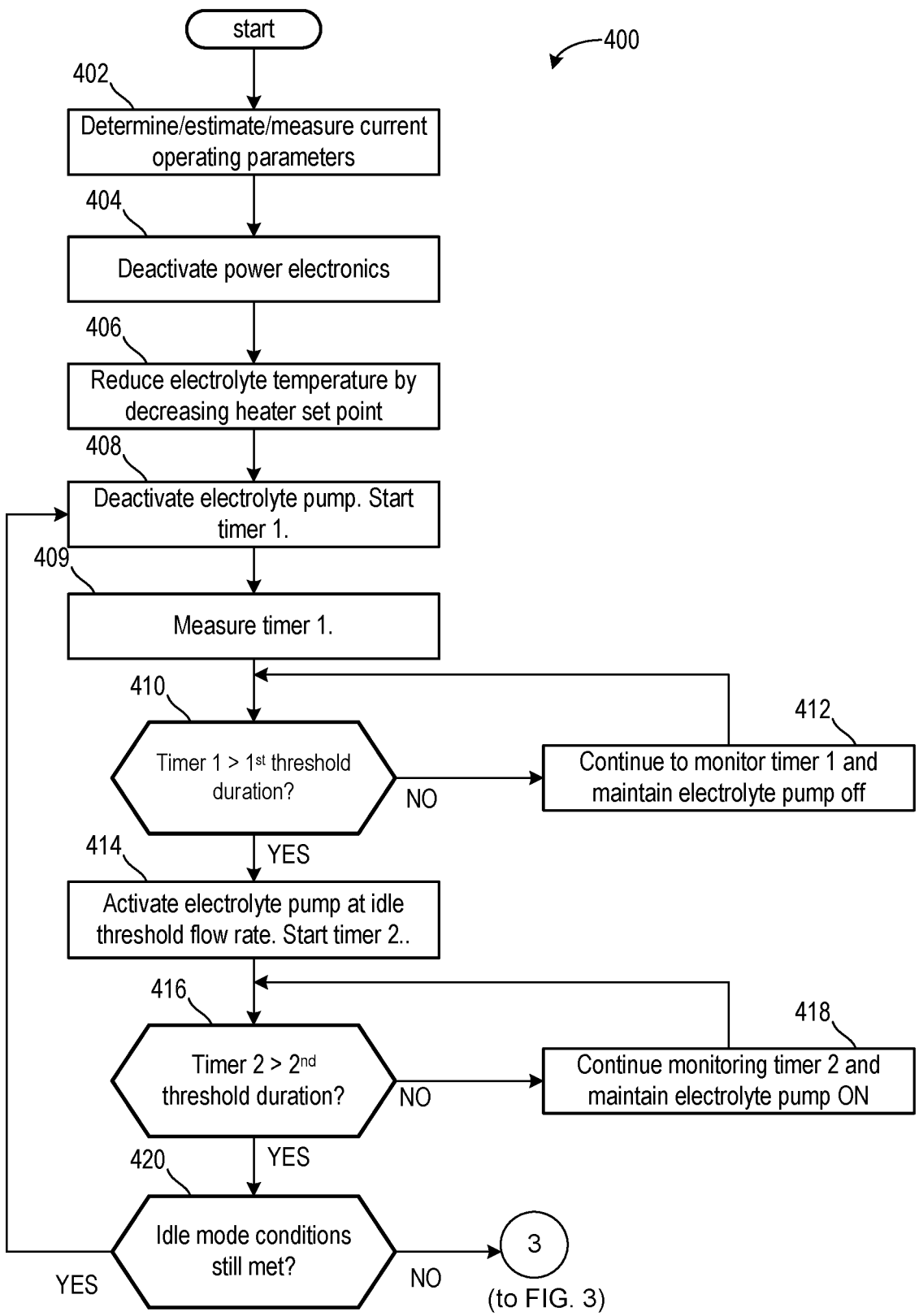
FIGS. 4-5 show flow charts of example methods for operating the redox flow battery system of FIG. 1 in an idle mode.
Figure 5:
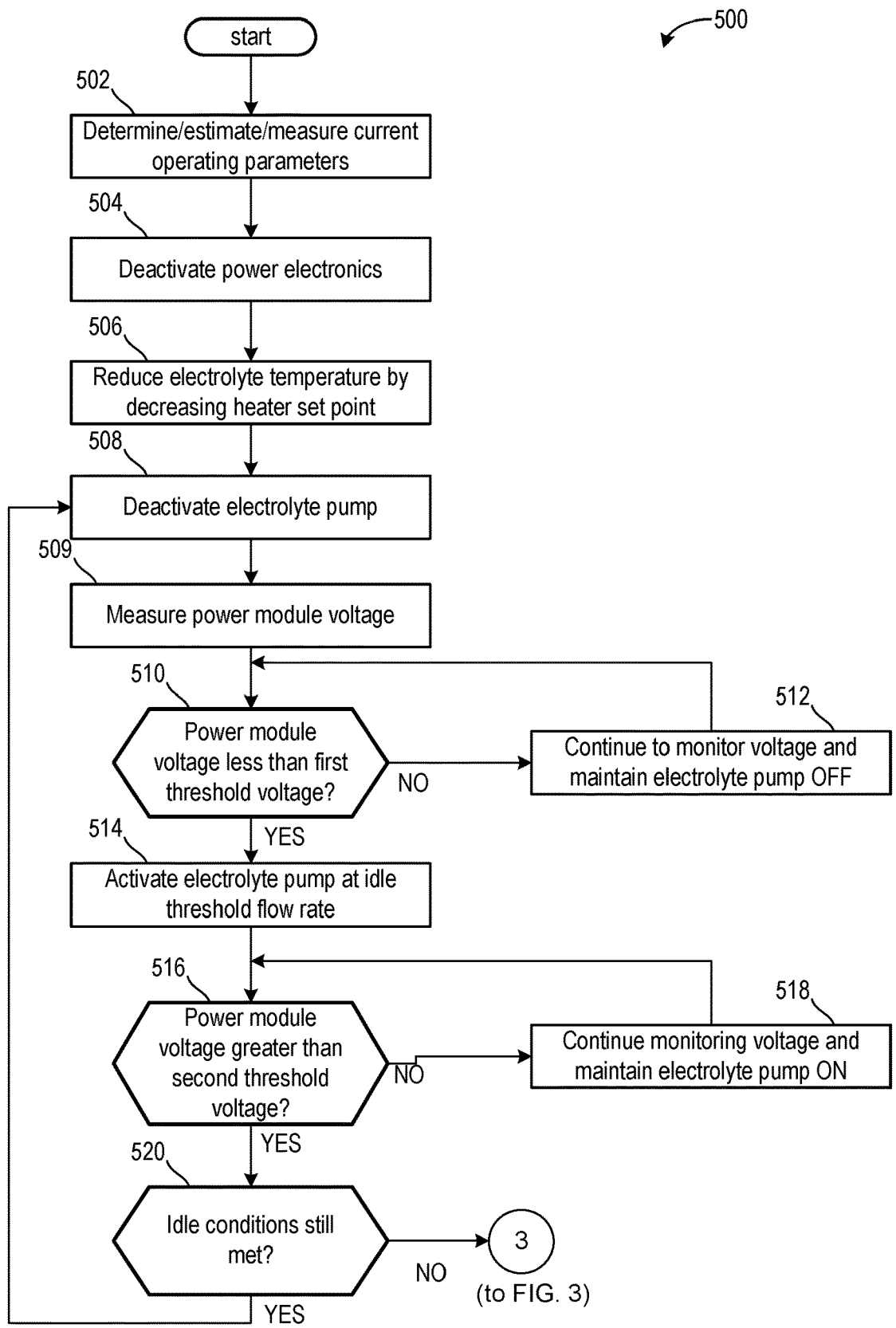

Turning now to FIGS. 3-5, they show flow charts for method 300, 400, and 500, respectively, for operating the redox flow battery system of FIGS. 1 and 2. Instructions for carrying out methods 300, 400, and 500 may reside on board and be executed by a controller, such as controller 88 of FIG. 1. For example, the executable instructions may be stored in non-transitory memory on board the controller and may be executed in conjunction with signals received from sensors of redox flow battery system, such as the sensors described above with reference to FIG. 1. The controller may further employ actuators including pumps, valves, heaters, and the like, as described above with reference to FIG. 1, of redox flow battery system to adjust battery operation, according to the methods described below.

Method 300 includes a method for determining when a redox flow battery system may be in a charging, discharging, or idle mode. The method 300 may begin at 302, where the method includes determining, estimating, and/or measuring current battery operating parameters. Current battery operating parameters may include, but are not limited to, one or more of battery state of charge (SOC), power module voltage, DC current, pump activity (e.g., electrolyte pump ON/OFF statuses, electrolyte pump flow rates, pump timers, and the like), electrolyte temperatures, power (including current and voltage) supplied to the power module, power (including current and voltage) supplied by the power module, internal power demand set points, and external power demand set points, and the like.

At 304, the method 300 includes determining if the redox flow battery system is currently being charged or in a charging mode. The redox flow battery system being in a charging mode may include one or more redox flow battery cells of the redox flow battery system being in a charging mode. The charging mode may be indicated by a set point or desired SOC for one or more redox flow battery cells being greater than an actual SOC for the one or more redox flow battery cells. In another example, charging mode may be indicated by the desired SOC being greater than the actual SOC by more than a charging threshold SOC difference. Additionally or alternatively, the redox flow battery system may be charging when a DC current from the power module is positive. In one example, DC current may be positive when current is flowing into the power module from an external power source. The DC current magnitude and direction may be measured by determining the voltage drop across a shunt resistor electrically connected with the power module.

In an alternate example, a redox flow battery system being in a charging mode may be indicated by a supply of power (including a supply of current and/or voltage) to the power module being greater than a charging threshold supply of power. The charging threshold supply of power may refer to a rate of power supply to the redox flow battery system greater than an incidental or auxiliary rate of power supply to the power module used for powering sensors, lighting, and other auxiliary devices related to the power module. In this way, supplying power greater than the threshold supply of power indicates that current is being supplied directly to one or more plating electrodes, resulting in reduction of metal ion at the plating electrode surface and plating of the reduced metal thereat. Similarly the charging mode may be indicated by SOC of one or more redox flow battery cells increasing at a rate greater than a threshold rate of SOC increase as a result of supplying power to the redox flow battery system during charging.

In another example, determination of the redox flow battery system being in a charging mode may be based on a flow rate of electrolyte being supplied to one or both of the negative and positive electrolyte chambers of a redox flow battery cell being greater than a charging threshold flow rate. The first threshold (negative or positive electrolyte) flow rate may refer to a flow rate that is greater than a flow rate of a pump used for electrolyte recirculation during an idle mode Pumping the electrolyte at a flow rate greater than the charging threshold flow rate may enable the flow rate of electrolyte being supplied to the negative and positive electrolyte chambers to be high enough to sustain a desired charging rate. The rate of supply of electrolytes may thus be related to the stoichiometry of the redox reactions occurring at the redox flow battery cell electrodes. As an idealized simple example, in the case of an IFB, for every two electrons supplied during charging at the negative electrode, one ferrous ion are supplied to the negative electrolyte chamber for reduction thereat, and two ferric ions are supplied at the positive electrolyte chamber for oxidation thereat. In this way the electrolyte flow rates and the charging threshold electrolyte flow rates to each of the positive and negative electrolyte chambers corresponding to operation in a charging mode may be unequal. Furthermore, electrolyte flow rates in excess of the idealized stoichiometric flow rates may be supplied to the redox flow battery cell to support a desired charging rate to account for non-ideal mixing and losses within the system.

As a further example, while charging, the ionic species in the positive and negative electrode compartments 22 and 20 may be changing at rates characteristic of being in a charging mode or may attain steady-state values (relative to an electrolyte pumping rate) associated with charging mode. For example, during charging, plating of ferrous ion may result in a characteristic decrease (or characteristic rate of decrease) in ferrous ion concentration in the negative electrolyte compartment. Similarly the concentration (or rate of change in concentration) of other ionic species such as ferric ion, chloride ion, hydrogen protons (e.g. pH), and other species may be characteristic of operating the redox flow battery cell in a charging mode. Furthermore, other electrolyte properties such as ionic strength, pH, and the like may have characteristic stead-state values or rates of change that can be used to indicate the redox flow battery system being in a charging mode. In other words, the controller may estimate and/or measure one or more species concentrations (or rate of change thereof), including measuring a pH and/or ionic strength, and determine, based on one or a combination of those measurements being beyond a charging threshold value characteristic to operation in charging mode, if the redox flow battery system is in a charging mode. Furthermore, the controller may determine the charging mode based on a rate of power supply to the power module, a measured DC current by way of a voltage drop across a shunt resistor electrically connected to the power module, a rate of increase in SOC, a difference between a desired and actual SOC, and/or a flow rate of electrolytes to one or more redox flow battery cells, as described above.

In further examples, the controller may enter a charging mode when a SOC of one or more of the redox flow battery cells has discharged below a lower threshold SOC. The lower threshold state of charge may include when the redox flow battery cell has been fully depleted of charge. In another example, the lower threshold state of charge may correspond to a SOC below which a risk of degradation of the redox flow battery cell may be increased. Other conditions for entering or beginning a charging mode may include when a desired power from an external load is greater than the available power from the redox flow battery system by more than a threshold power difference. Thus, the controller 88 may also determine that the redox flow battery system is in a charging mode when a condition for entering or beginning a charging mode is met.

Upon determining that the redox flow battery system is in charging mode, method 300 continues to 306 where the controller may initiate or resume/continue charging mode of the redox flow battery system. As described above, charging the redox flow battery system may include operating an electrolyte pump (e.g., one or more of negative positive electrolyte pumps 30 and 32 of FIG. 1) to flow electrolytes to redox flow battery negative and positive electrolyte chambers at a charging negative and positive threshold flow rates, respectively. In another example, the controller may supply power to the power module greater than a charging threshold supply of power in order to raise an actual SOC of one or more of the redox flow battery cells to a desired SOC. Raising the SOC of one or more of the redox flow battery cells to a desired SOC may include increasing the SOC by a rate of SOC increase greater than the charging threshold rate of SOC increase. Furthermore, the controller may operate one or more actuators in order to maintain one or more of a combination of electrolyte species concentrations, pH, ionic strength, and other electrolyte characteristics at a desired value that may correspond to the redox flow battery system being in a charging mode. In one example the desired values may include being beyond a threshold value characteristic to operation of the redox flow battery system in the charging mode.

If a redox flow battery is not being charged, then the method 300 proceeds from 304 to 308 to determine if redox flow battery is being discharged. The redox flow battery system being in a discharge mode may include one or more redox flow battery cells of the redox flow battery system being in a discharge mode. The discharge mode may be indicated by a set point or desired SOC for one or more redox flow battery cells being less than an actual SOC for the one or more redox flow battery cells. In another example, a discharge mode may be indicated by the desired SOC being less than the actual SOC by more than a threshold difference.

In one example, a redox flow battery system being in a discharge mode may be indicated by a supply of power (including a supply of current and/or voltage) from the power module to an external load being greater than a charging threshold supply of power. The charging threshold supply of power may refer to a rate of power supply from the redox flow battery system to an external load being greater than an incidental or auxiliary rate of power supply to the power module used for powering sensors, lighting, and other auxiliary devices related to the power module. In this way, supplying power from the power module greater than the charging threshold supply of power indicates that current is being supplied directly to the external load, resulting in oxidation of metal plated at the plating electrode surface to metal ion and solubilizing the metal ion into the negative electrolyte compartment. Similarly the discharge mode may be indicated by SOC of one or more redox flow battery cells decreasing at a rate greater than a threshold rate of SOC decrease as a result of supplying power from the redox flow battery system during discharge.

Additionally or alternatively, the redox flow battery system may be in a discharge mode when a DC current from the power module is negative. In one example, DC current may be negative when current is flowing out of the power module to an external load. As described above, the DC current magnitude and direction may be determined by measuring the voltage drop across a shunt resistor electrically connected to the power module.

In another example, determination of the redox flow battery system being in a discharge mode may be based on a flow rate of electrolyte being supplied to one or both of the negative and positive electrolyte chambers of a redox flow battery cell being greater than a discharge threshold flow rate. The discharge threshold (negative or positive electrolyte) flow rate may refer to a flow rate that is greater than a flow rate of a pump used for electrolyte recirculation during an idle mode. Pumping the electrolyte at a flow rate greater than the discharge threshold flow rate may enable the flow rate of electrolyte being supplied to the negative or positive electrolyte chambers to be high enough to sustain a desired redox flow battery system discharge rate. The rate of supply of electrolytes may thus be related to the stoichiometry of the redox reactions occurring at the redox flow battery cell electrodes. As an idealized simple example, in the case of an IFB, for every two electrons supplied from the redox flow battery system during discharge at the negative electrode, one ferrous ion is oxidized, and two ferrous ions are supplied at the positive electrolyte chamber for reduction thereat. In this way the electrolyte flow rates and the discharge threshold electrolyte flow rates to each of the positive and negative electrolyte chambers corresponding to operation in a discharging mode may be unequal. Furthermore, electrolyte flow rates in excess of the idealized stoichiometric flow rates may be supplied to the redox flow battery cell to support a desired discharge rate to account for non-ideal mixing and losses within the system.

As a further example, while in discharge mode, the ionic species in the positive and negative electrode compartments 22 and 20 may be changing at rates characteristic of being in a discharge mode or may attain steady-state values (relative to an electrolyte pumping rate) associated with discharge mode. For example, during discharge, plating of ferrous ion may result in a characteristic decrease (or characteristic rate of decrease) in ferrous ion concentration in the negative electrolyte compartment. Similarly the concentration (or rate of change in concentration) of other ionic species such as ferric ion, chloride ion, hydrogen protons (e.g. pH), and other species may be characteristic of operating the redox flow battery cell in a discharge mode. Furthermore, other electrolyte properties such as ionic strength, pH, and the like may have characteristic values or rates of change that can be used to indicate the redox flow battery system being in a discharge mode. In other words, the controller may estimate and/or measure one or more species concentrations (or rate of change thereof), including measuring a pH and/or ionic strength, and determine, based on one or a combination of those measurements being beyond a threshold value characteristic to operation in discharge mode, if the redox flow battery system is in a discharge mode. Furthermore, the controller may determine the discharge mode based on a rate of power supply to the power module, a rate of increase in SOC, a difference between a desired and actual SOC, and/or a flow rate of electrolytes to one or more redox flow battery cells, as described above.

In further examples, the controller may enter a discharge mode when a SOC of one or more of the redox flow battery cells has charged above a higher threshold SOC. The higher threshold state of charge may include when the redox flow battery cell has been fully charged to capacity. In another example, the higher threshold state of charge may correspond to a SOC above which a risk of overcharging and degradation of the redox flow battery cell may be increased. Other conditions for entering or beginning a discharge mode may include when an actual power supplied from the redox flow battery system to an external load is less than the desired power by more than a discharge threshold power difference. Thus, the controller 88 may also determine that the redox flow battery system is in a discharge mode when a condition for entering or beginning a discharging mode is met.

Upon determining that the redox flow battery system is in discharge mode, method 300 continues from 308 to 310 where the controller may initiate or resume/continue discharge mode of the redox flow battery system. As described above, discharge of the redox flow battery system may include operating an electrolyte pump (e.g., one or more of negative and positive electrolyte pumps 30 and 32 of FIG. 1) to flow electrolytes to redox flow battery negative and positive electrolyte chambers at discharge negative and positive threshold flow rates, respectively. In another example, the controller may supply power from the power module to an external load greater than a discharge threshold supply of power in order to lower an actual SOC of one or more of the redox flow battery cells to a desired SOC. Lowering the SOC of one or more of the redox flow battery cells to a desired SOC may include lowering the SOC by a rate of SOC increase greater than the threshold rate of SOC decrease. Furthermore, the controller may operate one or more actuators in order to maintain one or more of a combination of electrolyte species concentrations, pH, ionic strength, and other electrolyte characteristics at a desired value that may correspond to the redox flow battery system being in a discharge mode. In one example the desired values may include being beyond a threshold value characteristic to operation of the redox flow battery system in the discharge mode.

Returning to steps 304 and 308, for the case where the redox flow battery system is not operating in either a charging mode or a discharge mode, method 300 continues at 312 where the controller places the redox flow battery system in an idle operating mode. In one example, the redox flow battery may be in the idle mode when a DC current from the power module is less than or substantially equal to an idle threshold current. In one example, the idle threshold current may be zero. Method 400 and 500 of FIGS. 4 and 5, respectively, illustrate two embodiments of idling a redox flow battery system that can aid in lowering system capacity losses. The idle mode operation described in both the methods 400 and 500 includes cycling activity of the pump to maintain redox flow battery voltage and/or SOC within a threshold voltage and/or SOC range such that redox flow battery is promptly ready to provide a desired amount of power during a subsequent charge. In this way, a lag time and/or warm-up phase for a redox flow battery system may be reduced.

Turning now to FIG. 4, it shows a first method 400 for idling a redox flow battery system that can aid in lowering system capacity losses. Method 400 includes adjusting a pump ON/OFF status based on a time elapsed between pump activation cycles during redox flow battery idle mode. Method 400 may begin following 312 of method 300 of FIG. 3, when the redox flow battery system enters idle mode.

The method 400 may begin at 402, where the controller 88 may estimate and/or measure operating parameters of the redox flow battery system. As described above at 302 of FIG. 3, the controller 88 may determine one or more of battery state of charge (SOC), power module voltage, pump activity (e.g., electrolyte pump ON/OFF statuses, electrolyte pump flow rates, pump timers, and the like), electrolyte temperatures, power (including current and voltage) supplied to the power module, power (including current and voltage) supplied by the power module, internal power demand set points, and external power demand set points, and the like. Various operating parameters may be indicated by one or more sensors of the redox flow battery system.

At 404, in response to the redox flow battery system being in idle mode, the method 400 includes deactivating power electronics. Power electronics may include one or more of a DC/DC converter, DC/AC inverter, and a power module contactor. Deactivating power electronics may aid in reducing power consumption of the redox flow battery system while in idle mode. Deactivating the power electronics may include a controller signaling to one or more actuators of redox flow battery to power OFF, which may inhibit an ability of redox flow battery to discharge and/or charge. Deactivating the power electronics may include a mechanical switch that user may set in idle mode. In other words, Additionally, deactivating power electronics may include display of a message at a human machine interface (HMI) to alert a user that the redox flow battery is in (or initiating) the battery idle mode. Furthermore, the display of the HMI may be dimmed or put in sleep mode, thereby reducing an illumination emitted therefrom.

Next, at 406, in response to the redox flow battery system being in idle mode, the controller 88 may reduce the electrolyte temperature in order to further reduce power consumption while operating in idle mode. Reducing electrolyte temperature also may aid in reducing overall heat losses to the environment during idle mode due to lower temperature gradients between the redox flow battery system and the surrounding ambient atmosphere. In one example, reducing the electrolyte temperature may include adjusting a heater set point based on the redox flow battery system being in idle mode. For example, the controller 88 may send a control signal to one or more heater actuators to reduce an electrolyte temperature below an idle threshold temperature. The one or more heaters may be thermally coupled to the negative and positive electrolyte chambers 50 and 52, and/or the negative and positive electrolyte chambers of the multi-chambered electrolyte storage tank 110. Adjusting a heater set point may further include reducing a heater output power set point to reduce heater output power in order to reduce the electrolyte temperature below the idle threshold temperature. The idle threshold temperature may be based on a solubility or stability of the electrolytes during idle mode. For example, below the idle threshold temperature, a risk of destabilization of the electrolyte may be increased; destabilization of the electrolyte may include precipitation of electrolyte salts, which reduces the redox flow battery system capacity and performance. In contrast, above the threshold temperature, a risk of destabilization of the electrolyte is reduced and electrolyte stability can be maintained without precipitation of any electrolyte salts. The relationship between electrolyte solubility, the idle threshold temperature, and the control signal (e.g., heater output power) for the heater may be pre-determined or may be empirically determined for a particular redox flow battery system.

In another example, reducing the electrolyte temperature may include the controller 88 adjusting a control signal to one or more heaters to decrease a heater set point in order to decrease the electrolyte temperature during idle mode relative to an electrolyte temperature during battery charge and discharge modes. In one example, lowering a heater output power during redox flow battery idle mode may cool or lower an amount of heat transferred from the heater to the redox flow battery electrolyte relative to the amount of heat transferred from the heater to the electrolyte during redox flow battery charge and discharge modes. A temperature of a redox flow battery during battery charge and discharge modes may be substantially equal to 60° C., in one example. However, during redox flow battery idle mode, the heater setting may be decreased to heat redox flow battery to an idle threshold temperature equivalent to an ambient or room temperature range between 25-30° C.

At 408, in response to the redox flow battery system being in idle mode, the controller 88 begins cycling of the electrolyte pumps, including deactivating the electrolyte pump and initiating a first timer, timer 1. Timer 1 may be used to indicate an elapsed time since one or more electrolyte pumps have been deactivated. Deactivating the electrolyte pump may include deactivating the electrolyte pump, wherein the pump may remain dormant while the redox flow battery system may maintained in a state (e.g., SOC greater than a threshold SOC) where the redox flow battery system can readily provide a desired power output promptly upon receiving a power request. In one example deactivating the one or more electrolyte pumps may include deactivating pumps 30 and/or 32. In other examples, deactivating the one or more electrolyte pumps may include deactivating a sufficient number of pumps such that circulation of electrolyte to and from the redox flow battery cells is stopped. In further examples, deactivating the one or more electrolyte pumps may include deactivating a sufficient number of pumps such that circulation of electrolyte to and from the redox flow battery cells is reduced below a deactivation threshold flow rate. In this way, an electrolyte flow rate and pumping of electrolytes from the multi-chambered electrolyte storage tank 110 to the negative and positive electrolyte chambers 50 and 52 of or more redox flow battery cells 18 may be stopped or maintained at the deactivation threshold flow rate. In one example, the deactivation threshold flow rate may correspond to a flow rate below which shunting losses are substantially reduced since the supply of fresh electrolyte to the redox flow battery cells is reduced. In another example, the deactivation threshold flow rate may correspond to a zero flow rate, and shutting off the electrolyte pump. In some cases, having a non-zero deactivation flow rate may help to preserve a life of the electrolyte pump, by avoiding completely shutting the pump off. Stopping the electrolyte flow and/or reducing the flow of electrolyte to the deactivation threshold flow rate during idle mode can aid in reducing shunt losses conducted through the flowing electrolytes since the amount of fresh electrolyte supplied to the redox flow battery cells is reduced. Furthermore, shunt current losses may be confined to the existing volume of electrolyte within the power module when the pumps are deactivated, including operating below the deactivation threshold flow rate. Having a lower concentration of fresh electrolyte in the redox flow battery cells during idle mode can reduce a driving force for current shunt losses through the electrolyte. Furthermore, as described previously cycling the electrolyte pumps, including deactivating the electrolyte pumps at 408 can aid in reducing parasitic pump power losses.

At 409, the controller 88 may include measuring the first timer, and determining a duration for which one or more of the electrolyte pumps was deactivated. At 410, the controller 88 may determine if the first timer is greater than a first threshold duration. The first threshold duration may be based on target amount of time between successive activation (cycling ON) of the electrolyte pump during redox flow battery idle mode. As describe above, deactivating the electrolyte pump may include deactivating the electrolyte pump, wherein the pump may remain dormant while the redox flow battery system may maintained in a state (e.g., SOC greater than a threshold SOC) where the redox flow battery system can readily provide a desired power output promptly upon receiving a power request. In other words, the first threshold duration may correspond to a pump OFF interval during idle mode. In one example, the first threshold duration may be a fixed interval relative to a pump ON interval corresponding to a second threshold duration. In one case, the pump OFF interval may be set relative to the pump ON interval such that an overall pump OFF duration during idle mode is 5/6 of the overall idle time; in other words a ratio of the pump OFF interval to the pump ON interval would be 5 to 1 and a ratio of the first threshold duration to the second threshold duration would 5 to 1. For example, the first threshold duration may be equal to 50 minutes and the second threshold duration may be 10 minutes; thus, during idle mode, the pump would remain OFF 50 minutes for every hour of idle time.

Alternatively, the first threshold duration may be adjusted based on a power module voltage measured prior to the initiation of the battery idle mode. In one example, the first threshold duration may be higher corresponding to the power module voltage just prior to the entering battery idle mode being higher, and the first threshold duration may be lower for the case where the power module voltage just prior to entering battery idle mode is lower. In this way, the first threshold duration may allow for longer cycling periods from a higher initial voltage prior to entering idling mode, and may allow for shorter cycling periods from a lower initial voltage prior to entering idling mode. For the case where the first timer is less than the first threshold duration, then the method 400 proceeds from 410 to 412 to continue to monitor the first timer and maintains the electrolyte pump deactivated.

If the first timer is greater than the first threshold duration, then the method proceeds from 410 to 414 to send a control signal to the actuator of the electrolyte pump to activate the electrolyte pump at an idle threshold flow rate. The idle threshold flow rate may correspond to an electrolyte flow rate below which idling electrolyte within the power module is not refreshed enough so that a responsiveness of the redox flow battery system for supplying power on demand to an external load is reduced below a desirable level. In other words, if the electrolyte flow rate is below the idle threshold flow rate, the supply of electrolyte to the redox flow battery cells may not be sufficient to promptly respond to a command from the controller 88 for supplying power to an external load. As such there may be an undesirable extended delay, allowing for enough fresh electrolyte to reach the redox flow battery cells, before enough current/power can be supplied to meet the commanded demand. Said in another way, if the pump is not reactivated after the first threshold duration, a responsiveness of the redox flow battery system to promptly supply power to a commanded external load may be reduced. In one example, the idle threshold flow rate may be less than the first or discharge threshold flow rates describe above. For example, the idle threshold flow rate may correspond to 10% of the charge or discharge threshold flow rate. In some cases the idle threshold flow rate to a negative electrolyte compartment may be different from the idle threshold flow rate to the positive electrolyte compartment. At any rate, it will be appreciated that the pump flow rate is reduced for redox flow battery idle mode compared to the pump flow rate during the charge and discharge modes. A second timer is initiated in conjunction with the activation of the electrolyte pump, the second timer measuring a pump ON duration during the idle pump cycling of method 400.

At 416, the method includes determining the second timer is greater than a second threshold duration. The second threshold duration may be based on an amount of time desired to activate the pump during battery idle mode to maintain a responsiveness of the redox flow battery for meeting anticipated power demands from an external load, while also decreasing battery capacity losses experienced by the redox flow battery and parasitic power losses due to operation of the pump and heating element. Capacity losses may include a mitigated power output of redox flow battery. In one example, the second threshold duration is 20% of the first threshold duration.

If the second timer is less than the second threshold duration, then the electrolyte has not been adequately refreshed to achieve the desired system responsiveness to an anticipated external load command, and the method proceeds from 416 to 418 to continue monitoring the second timer. The electrolyte pump remains activated at the idling threshold flow rate while the second timer is less than the second threshold duration.

If the second timer is greater than the second threshold duration at 416, indicating that the electrolyte has been refreshed enough to allow for achieving a desired system responsiveness to an anticipated external load command, method 400 continues at 420 where it determines if idle mode conditions are continued to be met. Meeting idle mode conditions may include determining if the redox flow battery system is not in either a charging mode or a discharge mode. Thus, determining if idle mode conditions are still met may be performed as described for 304, 308, and 312 of method 300. For the case where idle conditions are still met, then the method proceeds back to 408 to continue idle mode operation. In this way, during the idle state, method 400 repeatedly cycles the electrolyte pump between the active state and the inactive state. For the case where idle conditions are not met (e.g., the redox flow system enters charging or discharge mode), the method 400 returns to method 300 of FIG. 3 after 312, and ends.

As described above, each of the idle threshold temperature, deactivation threshold flow rate, idle threshold flow rate, first threshold duration, and second threshold duration may be may be adjusted according to the anticipated power demands during a battery idle mode. For example, when the anticipated power demands during a battery idle mode are higher, an idle threshold temperature may be higher, a deactivation threshold flow rate may be higher, an idle threshold flow rate may be higher, a first threshold duration may be lower, and a second threshold duration may be higher in order to increase a responsiveness of the redox flow battery system. Conversely, when the anticipated power demands during a battery idle mode are lower, an idle threshold temperature may be lower, a deactivation threshold flow rate may be lower, an idle threshold flow rate may be lower, a first threshold duration may be higher, and a second threshold duration may be lower in order to decrease a responsiveness of the redox flow battery system while reducing parasitic power losses due to pumping and heating and reducing shunt losses through the electrolyte. In this way, idle mode operation parameters may be adjusted by the controller 88 depending on the anticipated power needs to maintain a redox flow battery system responsiveness while reducing parasitic and shunting losses.

Turning now to FIG. 5, it shows an alternate embodiment for a method 500 for adjusting a pump based on a voltage of redox flow battery measured during an idle mode for redox flow battery system. As such, the method 500 may be executed following 312 of method 300 of FIG. 3. The method 500 may begin at 502, where the method includes determining, estimating, and/or measuring current operating parameters as described for steps 302 and 402 of methods 300 and 400, respectively. Next, step 504, deactivating the power electronics, step 506, reducing electrolyte temperature by signaling to decrease a heater set point, and step 508, deactivating the electrolyte pump, maybe performed as described for steps 404, 406, and 408 of method 400, respectively.

Following deactivation of the electrolyte pump at 508, method 500 may continue at 509, where the controller 88 determines and/or measures the power module voltage. The power module voltage may refer to the voltage across the redox flow battery cell stacks within the power module. In one example, battery is fully charged and each cell open circuit voltage is about 1.2V. As a result, the power module voltage is the sum of all the cell voltages minus shunting voltage loss (voltage drop across shunt resistors).

Next, at 510, the controller 88 may determine if the power module voltage is less than a first threshold voltage. The power module first threshold voltage may be determined by the minimal load it can sustain with the available electrolyte within the power module during idle mode, with no additional electrolyte pumping. In another example, the first threshold voltage may refer to a voltage below which the redox flow battery system may be unable to respond to an anticipated power demand from an internal or external load. In this way the first threshold voltage may be higher when the anticipated power demand may be higher and the first threshold voltage may be lower when the anticipated power demand is lower. If the power module voltage is greater than or equal to the first threshold voltage, then the method proceeds from 510 to 512 to continue to monitor the voltage and maintains the electrolyte pump deactivated.

For the case where the power module voltage decreases below the first threshold voltage, then the method 500 proceeds from 510 to 514 to switch the pump to an active state, including sending a control signal to the actuator of the pump to activate the electrolyte pump at the idle threshold flow rate. As described above with reference to method 400, the idle threshold flow rate may correspond to an electrolyte flow rate below which idling electrolyte within the power module is not refreshed enough so that a responsiveness of the redox flow battery system for supplying power on demand to an external load is reduced below a desirable level. In one example, the idle threshold flow rate may be less than the charging threshold flow rate or the discharge threshold flow rate described above with reference to method 300. At any rate, it will be appreciated that the pump flow rate may be reduced to a lower flow rate during redox flow battery idle mode as compared to the pump flow rate during the charge and discharge modes. In this way, electrolytes in redox flow battery cells may be replenished and refreshed sufficiently to increase a power module voltage, while reducing parasitic power and shunting losses.

At 516, the method includes determining if the power module voltage is greater than or equal to a second threshold voltage. In one example, the second threshold voltage may include a voltage greater than the first threshold voltage. The second threshold voltage may correspond to a power module voltage above which shunt current losses increase appreciably since the flow of fresh electrolyte recirculated to the redox flow battery cells is higher. The second threshold voltage may also correspond to a power module open circuit voltage at the given state of charge or when power module voltage does not change anymore indicating electrolyte may be fully replenished. If the power module voltage is less than the second threshold voltage, then the method proceeds from 516 to 518 to continue monitoring the voltage and maintaining the pump active (e.g., ON) at the idle threshold flow rate.

If the voltage is greater than or equal to the second threshold voltage, then the method proceeds to 520 to determine if idle conditions are still met. If the idle conditions are no longer met, then the method proceeds to FIG. 3. If the idle conditions are still met, then the method proceeds back to 508 to switch the pump to an inactive state in response to the power module voltage being greater than the second threshold voltage. In this way, during the idle state, method 500 repeatedly cycles the electrolyte pump between the active state and the inactive state. For the case where idle conditions are not met (e.g., the redox flow system enters charging or discharge mode), the method 500 returns to method 300 of FIG. 3 after 312, and ends.

Thus, an example method of operating a redox flow battery system may include switching the redox flow battery system to an idle mode, wherein the idle mode includes operation of the redox flow battery system outside of a charging mode and outside of a discharge mode. Furthermore, in response to switching to the idle mode, the example method may include repeatedly cycling operation of an electrolyte pump between an idling threshold flow rate less than a charging threshold flow rate and a deactivation threshold flow rate, and in response to switching to the charging mode, maintaining operation of the electrolyte pump at the charging threshold flow rate greater than the idling threshold flow rate. A second example of the method optionally includes the first example, and may further include, in response to switching to the discharge mode, maintaining operation of the electrolyte pump at a discharge threshold flow rate greater than the idling threshold flow rate. A third example of the method optionally includes one or more of the first and second examples, and further includes wherein operation of the electrolyte pump at the deactivation threshold flow rate is maintained for a first threshold duration, operation of the electrolyte pump at the idling threshold flow rate is for a second threshold duration, and the deactivation threshold duration is greater than the second threshold duration. A fourth example of the method optionally includes one or more of the first through third examples, and further includes wherein the idling threshold duration is less than 20% of the first threshold duration. A fifth example of the method optionally includes one or more of the first through fourth examples, and further includes wherein the idling threshold flow rate is adjusted higher in response to an anticipated load demand of the redox flow battery system being higher, and the idling threshold flow rate is adjusted lower in response to an anticipated load demand of the redox flow battery system being lower. A sixth example of the method optionally includes one or more of the first through fifth examples, and further includes wherein the first threshold duration is adjusted lower in response to an anticipated load demand of the redox flow battery system being higher, and the first threshold duration is adjusted higher in response to an anticipated load demand of the redox flow battery system being lower. A seventh example of the method optionally includes one or more of the first through sixth examples, and further includes wherein the second threshold duration is adjusted higher in response to an anticipated load demand of the redox flow battery system being higher, and the second threshold duration is adjusted lower in response to an anticipated load demand of the redox flow battery system being lower.

Thus, an example method of operating a redox flow battery system may include operating the redox flow battery system in an idle mode during a condition when the redox flow battery system is operating outside of a charging mode and outside of a discharge mode, during operation in the idle mode, repeatedly cycling operation of an electrolyte pump between an active state and an inactive state, wherein the active state comprises pumping electrolyte at an idling threshold flow rate less than a charging threshold flow rate, and the inactive state comprises deactivating the electrolyte pump, and in response to switching to the discharge mode, maintaining operation of the electrolyte pump at the discharge threshold flow rate. A second example of the method may optionally include the first example, and further includes in response to switching to the charging mode, maintaining operation of the electrolyte pump at the charging threshold flow rate. A third example of the method optionally includes one or more of the first and second examples, and further includes wherein cycling operation of the electrolyte pump between the active state and the inactive state includes, switching from the active state to the inactive state in response to a power module voltage increasing above a second threshold voltage, and switching from the inactive state to the active state in response to a power module voltage decreasing below a first threshold voltage, the first threshold voltage being less than the second threshold voltage. A fourth example of the method optionally includes one or more of the first through third examples, and further includes wherein the first threshold voltage is less than the charging threshold voltage. A fifth example of the method optionally includes one or more of the first through fourth examples, and further includes wherein the idling threshold flow rate is adjusted higher in response to an anticipated load demand of the redox flow battery system being higher, and the idling threshold flow rate is adjusted lower in response to the anticipated load demand of the redox flow battery system being lower. A sixth example of the method optionally includes one or more of the first through fifth examples, and further includes wherein the first threshold voltage is adjusted higher in response to the anticipated load demand of the redox flow battery system being higher, and the first threshold voltage is adjusted lower in response to the anticipated load demand of the redox flow battery system being lower. A seventh example of the method optionally includes one or more of the first through sixth examples, and further includes wherein the second threshold voltage is adjusted higher in response to the anticipated load demand of the redox flow battery system being higher, and the second threshold voltage is adjusted lower in response to the anticipated load demand of the redox flow battery system being lower.

As described above, each of the idle threshold temperature, deactivation threshold flow rate, idle threshold flow rate, first threshold voltage, and second threshold voltage may be may be adjusted according to the anticipated power demands during a battery idle mode. For example, when the anticipated power demands during a battery idle mode are higher, an idle threshold temperature may be higher, a deactivation threshold flow rate may be higher, an idle threshold flow rate may be higher, a first threshold voltage may be higher, and a second threshold voltage may be higher in order to increase a responsiveness of the redox flow battery system. Conversely, when the anticipated power demands during a battery idle mode are lower, an idle threshold temperature may be lower, a deactivation threshold flow rate may be lower, an idle threshold flow rate may be lower, a first threshold voltage may be lower, and a second threshold duration may be lower in order to decrease a responsiveness of the redox flow battery system while reducing parasitic power losses due to pumping and heating and reducing shunt losses through the electrolyte. In this way, idle mode operation parameters may be adjusted by the controller 88 depending on the anticipated power needs to maintain a redox flow battery system responsiveness while reducing parasitic and shunting losses.

Figure 8:
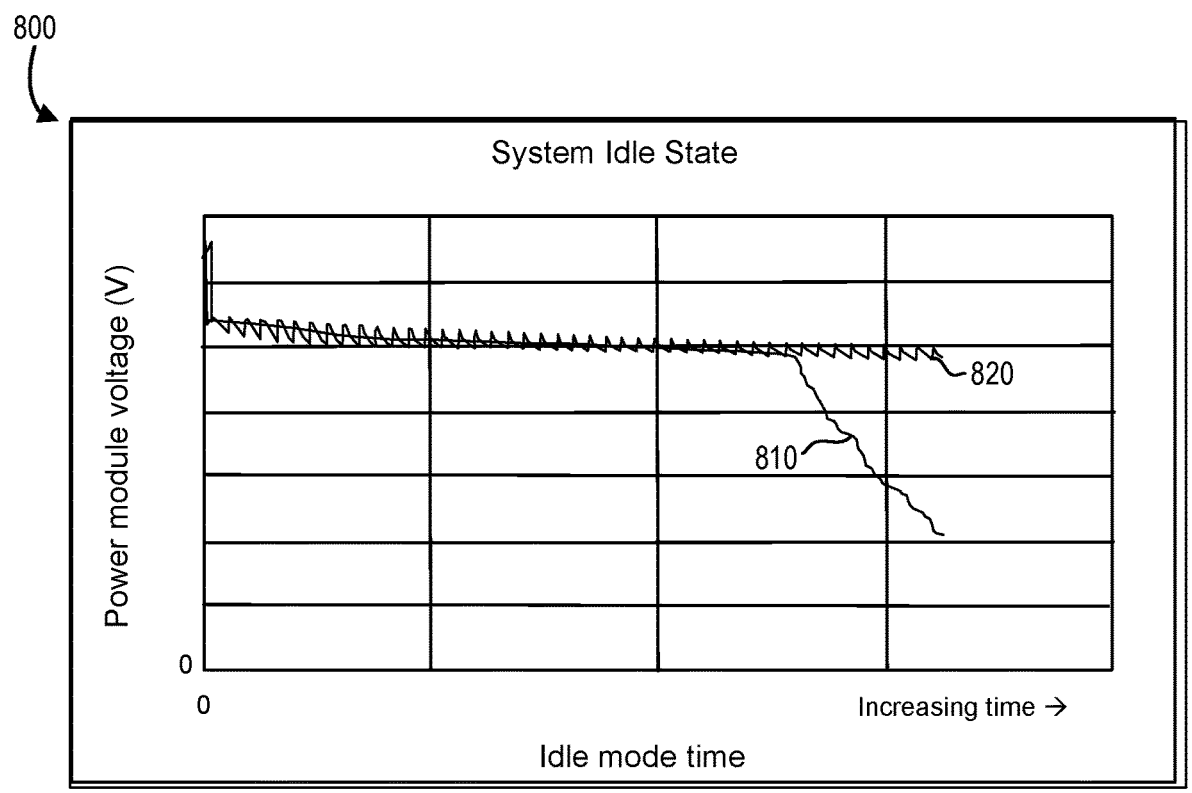
FIG. 8 shows a plot comparing operation of the redox flow battery system of FIG. 1 using the methods of FIGS. 3-5 to a conventionally operated system.

Turning now to FIG. 8, it illustrates an example plot showing operation of an example redox flow battery system.

Trend line 810 represents the power module voltage during idling mode while maintaining an electrolyte pump ON to pump electrolyte continuously at charge/discharge flow rates, maintaining power electronics ON, and maintaining an electrolyte temperature at charge/discharge temperatures. Owing to larger shunt current losses and higher parasitic pumping losses, the power module voltage during idling begins to sharply decrease after about 40 h. In contrast, while in idle mode, reducing the electrolyte temperature to the idle threshold temperature, turning OFF power electronics, and cycling the electrolyte pump between an idle threshold flow rate for a second threshold duration and a deactivation threshold flow rate for a first threshold duration (e.g., operating the redox flow battery system according to methods 300 and 400) can mitigate capacity losses, as shown by trend line 820.

Figure 6:
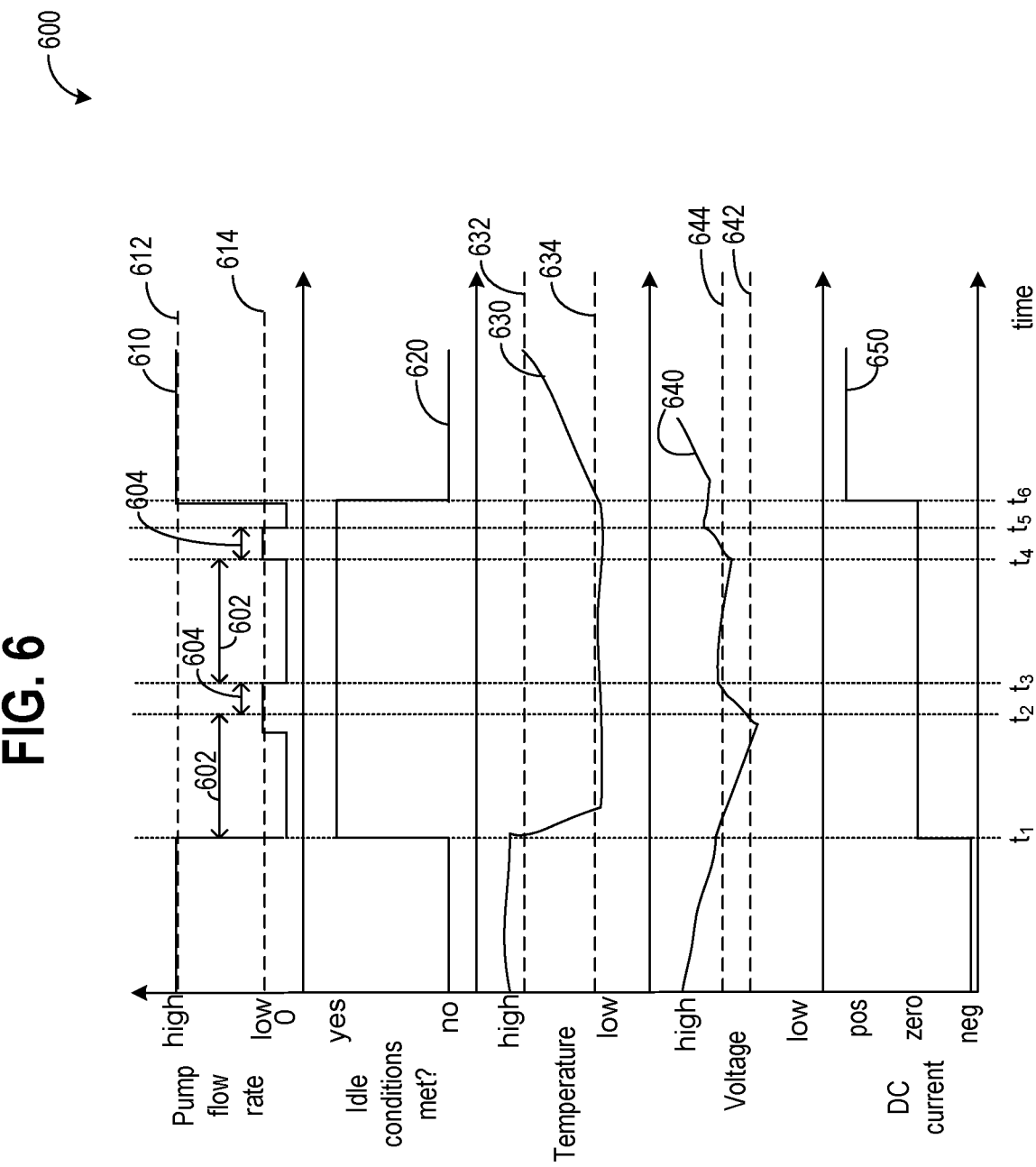
FIGS. 6 and 7 show time line plots illustrating operation of the redox flow battery system of FIG. 1 an idle mode.

Turning now to FIG. 6, it shows a time plot 600 graphically illustrating battery conditions during and outside of a battery idle mode. The time plot 600 illustrates the methods 300, 400, and 500 executed in parallel by battery system of FIGS. 1 and 2. In this way, each of the methods 300, 400, and 500 may occur simultaneously to one another. For example, the voltage measured in the method 500 may be compared to the first threshold voltage simultaneously to first and second timers being compared to first and second threshold durations, respectively. Plot 610 illustrates an electrolyte pump flow rate, plot 620 illustrates if a redox flow battery idle condition is being met, plot 630 illustrates a temperature of redox flow battery, plot 640 illustrates a battery voltage, and plot 650 illustrates a DC current, for example a DC current flowing through a shunt resistor electrically coupled to the power module. Dashed line 612 indicates a threshold charge/discharge electrolyte flow rate and dashed line 614 indicates an idle threshold electrolyte flow rate. Line 632 illustrates a second threshold battery temperature and line 634 illustrates a first threshold battery temperature. As shown, the second threshold battery temperature is greater than the first threshold battery temperature. In one example, the second threshold battery temperature is substantially equal to a battery temperature outside of redox flow battery idle mode and the first threshold battery temperature is substantially equal to a desired battery temperature during redox flow battery idle mode. Line 642 depicts a first threshold voltage and line 644 depicts a second threshold voltage. The first and second threshold voltages may be substantially similar to those described above with respect to FIG. 5. The DC current may have a directionality based on if the redox flow battery system is in a charging or discharge mode. For example, positive DC current may correspond to an external device flowing current to the battery during charging, and negative DC current may correspond to the battery flowing current to an external device during discharge. Thus, neutral DC current (e.g., zero charge), may correspond to no current flow to and from the battery. In one example, positive DC current corresponds to a charging mode, negative DC current corresponds to a discharging mode, and neutral DC current corresponds to an idle mode. The plot 600 measures time along a horizontal axis, where time increases from a left to right side of the figure.

Prior to t1, the electrolyte pump flow rate (plot 610) is relatively high and substantially equal to the threshold charge/discharge electrolyte flow rate (line 612). Battery idle conditions are not met as shown by plot 620 being aligned with "NO". A redox flow battery temperature (plot 630) is equal to a temperature greater than the second threshold battery temperature (line 632). A power module voltage (plot 640) is decreasing from a relatively high battery voltage toward the second threshold voltage (line 644). DC current (line 650) aligns with the negative value, indicating current is flowing away from the battery to an external device. As such, the redox flow battery may be operating in a discharge mode.

At t1, redox flow battery idle conditions are met and redox flow battery transitions from the discharge mode to the idle mode. DC current aligns with zero and/or neutral as substantially no current flows to and/or away from the redox low battery. As described with respect to FIGS. 4 and 5, the power electronics are deactivated upon entering redox flow battery idle mode. Additionally, the heater is adjusted to a lower set point to heat the redox flow battery to a temperature less than the first threshold battery temperature (line 634). Furthermore, the electrolyte pump is deactivated (e.g., switched OFF), as shown by plot 610 aligning with "0" and the electrolyte pump flow rate decreases to a flow rate less than the idle threshold electrolyte flow rate 614. In this way, electrolytes are no longer flowing to redox flow battery. The first timer may be started to begin tracking time corresponding to a duration the electrolyte pump is deactivated.

After t1 and prior to t2, redox flow battery remains in the idle mode. The redox flow battery temperature decreases to a battery temperature substantially equal to the first threshold battery temperature. The power module voltage continues to decrease and decreases to a voltage less than the first threshold voltage after entering redox flow battery idle mode. Specifically, the voltage decreases to a voltage less than the first threshold voltage following an amount of time less than the first threshold duration. Double headed arrow 602 illustrates the first threshold duration. In response, the electrolyte pump is activated to the idle threshold electrolyte flow rate 614 less than the threshold charge/discharge flow rate 612. In one example, the electrolyte pump is activated to a flow rate substantially equal to 5-10% of the threshold charge/discharge flow rate 612. The DC current remains substantially equal to zero during the idle mode, despite the electrolyte pump being activated. As such, the pump may be powered by an external source during the redox flow battery idle mode. Additionally or alternatively, the DC current may move to slightly positive and slightly negative positions during the idle mode. Slightly positive and slightly negative positions are respectively less than the positive and negative positions during charging and discharging modes. In this way, the power module voltage begins to increase as fresh electrolytes are delivered to the redox flow battery.

At t2, battery idle conditions are still met and redox flow battery temperature is substantially equal to the first threshold battery temperature. The power module voltage continues to increases and increases to a voltage greater than the first threshold voltage and less than the second threshold voltage. As such, the electrolyte pump remains active at the idle threshold flow rate (dashed line 614).

After t2 and prior to t3, power module voltage continues to increase toward the second threshold voltage. As such, the electrolyte pump remains active. At t3, power module voltage is greater than the second threshold voltage and the electrolyte pump is deactivated. Double headed arrow 604 represents a second threshold duration, which is substantially equal to the second threshold duration described above with respect to FIG. 4. In this way, the electrolyte pump was active during redox flow battery idle mode for an amount of time greater than second threshold duration. The first timer is initiated at t3 following deactivation of the electrolyte pump.

Thus, in some embodiments where the power module voltage is monitored and electrolyte pump cycles are timed, replenishing the power module voltage may supersede the fixed time cycles. Specifically, the electrolyte pump is initiated in response to the power module voltage falling below the first threshold voltage even if the first timer is less than the first threshold duration. Additionally, the electrolyte pump may be maintained active if the power module voltage is less than the second threshold voltage even if the second timer is greater than the second threshold duration.

After t3 and prior to t4, power module voltage decreases to a voltage less than the second threshold voltage and greater than the first threshold voltage. As such, the electrolyte pump remains deactivated. At t4, the first timer is equal to the first threshold duration. As such, a controller signals to an actuator of the electrolyte pump to activate the pump to the idle threshold flow rate 614. As such, the second time is activated. In alternate examples, the controller may signal to activate the electrolyte pump to a flow rate less than the idle threshold flow rate. This may be due to the power module voltage being greater than the first threshold voltage. As such, less charging may be desired than when the power module voltage is less than the first threshold voltage. In some examples, the electrolyte pump may not be activated at t4 due to the power module voltage being greater than the first threshold voltage, despite the first timer exceeding the first threshold duration.

After t4 and prior to t5, the second timer is compared to the second threshold duration (double headed arrow 604) and the electrolyte pump remains active since the second timer is less than the second threshold duration. The power module voltage increases to a voltage greater than the second threshold voltage. Redox flow battery temperature remains substantially equal to the first threshold battery temperature. At t5, the second timer is substantially equal to the second threshold duration. The power module voltage is no longer increasing and is equal to a voltage greater than the second threshold voltage.

After t5, redox flow battery idle conditions are met for a period of time, wherein during the period of time the electrolyte pump is deactivated, redox flow battery temperature is substantially equal to the first threshold battery temperature, and the power module voltage decreases toward the second threshold voltage. At t6, redox flow battery idle conditions are no longer met. As such, redox flow battery heater is adjusted to heat redox flow battery to a temperature greater than or equal to the second threshold battery temperature. The electrolyte pump is reactivated and is set to a flow rate substantially equal to the threshold charging/discharging flow rate. Lastly, the power module voltage begins to increase to a voltage higher than the second threshold voltage. This is further indicated by the DC current moving to a positive position, wherein an external source is flowing current to the redox flow battery. In this way, redox flow battery is in the charge mode and has exited the idle mode.

Figure 7:
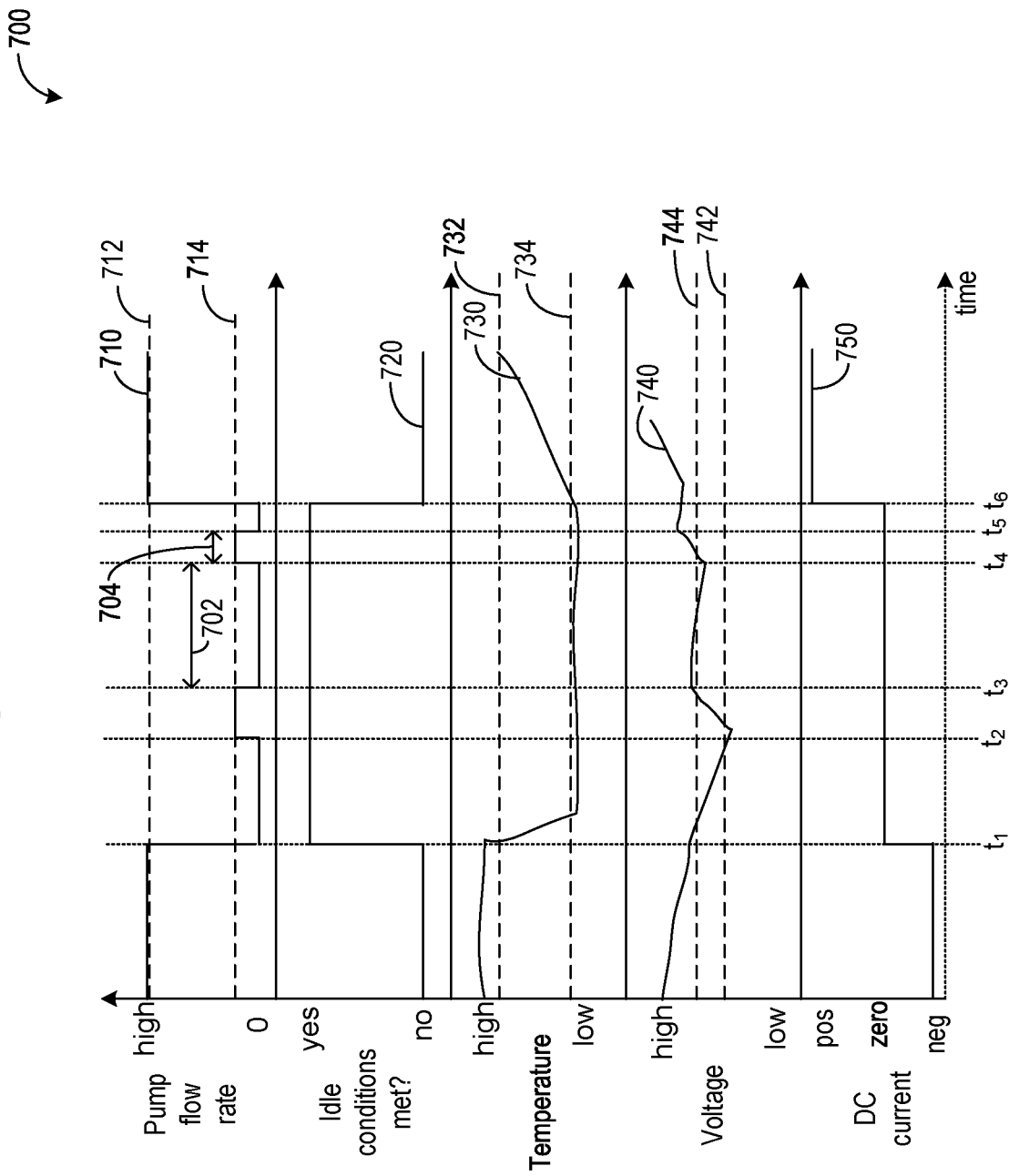

Turning now to FIG. 7, it shows a time plot 700 for operating the redox flow battery system of FIG. 1 according to methods 300, 400, and 500. The time plot 700 illustrates the methods 300, 400, and 500 executed by the redox flow battery of FIG. 1. The methods 400 and 500 are illustrated occurring sequentially to one another. As such, the methods 400 and 500 do not occur simultaneously in the embodiment of FIG. 7. Specifically, the method 500 is illustrated from t1 to t3 and the method 400 is illustrated from t3 to t5. Plot 710 illustrates an electrolyte pump flow rate, plot 720 illustrates if a redox flow battery idle condition is being met, plot 730 illustrates a temperature of the redox flow battery, plot 740 illustrates a power module voltage, and plot 750 illustrates a DC current (e.g., a DC current flowing through a shunt resistor electrically coupled to the power module). Line 732 illustrates a second threshold battery temperature and line 734 illustrates a first threshold battery temperature. As shown, the second threshold battery temperature is greater than the first threshold battery temperature. In one example, the second threshold battery temperature is substantially equal to a battery temperature outside of redox flow battery idle mode and the first threshold battery temperature is substantially equal to a desired battery temperature during redox flow battery idle mode. Line 742 depicts a first threshold voltage and line 744 depicts a second threshold voltage. The first and second threshold voltages may be substantially similar to those described above with respect to FIG. 5. The DC current may have a directionality based on its charge. For example, positive DC current may correspond to an external device flowing current to the battery and negative DC current may correspond to the battery flowing current to an external device. Thus, neutral DC current (e.g., zero charge), may correspond to no current flow to and from the battery. In one example, positive DC current corresponds to a charging mode, negative DC current corresponds to a discharging mode, and neutral DC current corresponds to an idle mode. The plot 700 measures time along a horizontal axis, where time increases from a left side to a right side of the figure.

Prior to t1, the electrolyte pump flow rate (plot 710) is relatively high and substantially equal to a threshold charge/discharge flow rate (line 712). Battery idle conditions are not met as shown by plot 720 being aligned with "NO". A redox flow battery temperature (plot 730) is equal to a temperature greater than the second threshold battery temperature (line 732). A power module voltage (plot 740) is decreasing from a relatively high battery voltage toward the second threshold voltage (line 744). DC current (line 750) aligns with the negative value, indicating current is flowing away from the battery to an external device. As such, the redox flow battery may be operating in a discharge mode.

At t1, redox flow battery idle conditions are met and redox flow battery transitions from the discharge mode to the idle mode. As described with respect to FIGS. 4 and 5, the power electronics are deactivated upon entering redox flow battery idle mode. Additionally, the heater is adjusted to heat the redox flow battery to a temperature less than the first threshold battery temperature (line 734). Furthermore, the electrolyte pump is deactivated (e.g., switched OFF), as shown by plot 710 aligning with "0" and the electrolyte pump flow rate decreases. In this way, electrolytes are no longer flowing to redox flow battery. The first timer is not activated due to only the power module voltage being monitored.

After t1 and prior to t2, redox flow battery remains in the idle mode. The redox flow battery temperature decreases to a battery temperature substantially equal to the first threshold battery temperature. The power module voltage continues to decrease and decreases to a voltage less than the first threshold voltage after entering redox flow battery idle mode. Specifically, the voltage decreases to a voltage less than the first threshold voltage. In response, the electrolyte pump is activated to the idle threshold electrolyte flow rate 714 less than the threshold charge/discharge flow rate 712. In one example, the idle threshold flow rate may be substantially equal to 5-10% of the threshold charge/discharge flow rate 712. The DC current remains substantially equal to zero during the idle mode, despite the electrolyte pump being activated. As such, the pump may be powered by an external source during the redox flow battery idle mode. Additionally or alternatively, the DC current may move to slightly positive and slightly negative positions during the idle mode. Slightly positive and slightly negative positions are respectively less than the positive and negative positions during charging and discharging modes. In this way, the power module voltage begins to increase as fresh electrolytes are delivered to the redox flow battery.

At t2, battery idle conditions are still met and redox flow battery temperature is substantially equal to the first threshold battery temperature. The power module voltage continues to increases and increases to a voltage greater than the first threshold voltage and less than the second threshold voltage. As such, the electrolyte pump remains active at the idle threshold flow rate.

After t2 and prior to t3, power module voltage continues to increase toward the second threshold voltage. As such, the electrolyte pump remains active. At t3, power module voltage is greater than the second threshold voltage and the electrolyte pump is deactivated. The first timer is initiated at t3 following deactivation of the electrolyte pump. As such, the method 500 is completed. After time t3, plot 700 illustrates operation of the redox flow battery system according to execution of method 300 in conjunction with the method 400.

After t3 and prior to t4, power module voltage decreases to a voltage less than the second threshold voltage and greater than the first threshold voltage. As such, the electrolyte pump remains deactivated. At t4, the first timer is equal to the first threshold duration (double headed arrow 702). As such, a controller signals to an actuator of the electrolyte pump to activate the pump to the idle threshold flow rate. As such, the second timer is activated. In alternate examples, the controller may signal to activate the electrolyte pump to a flow rate less than or greater than the idling threshold flow rate.

After t4 and prior to t5, the second timer is compared to the second threshold duration (double headed arrow 704) and the electrolyte pump remains active since the second timer is less than the second threshold duration. The power module voltage increases to a voltage greater than the second threshold voltage. Redox flow battery temperature remains substantially equal to the first threshold battery temperature. At t5, the second timer is substantially equal to the second threshold duration. The power module voltage is no longer increasing and is equal to a voltage greater than the second threshold voltage.

After t5, redox flow battery idle conditions are met for a period of time, wherein during the period of time the electrolyte pump is deactivated, redox flow battery temperature is substantially equal to the first threshold battery temperature, and the power module voltage decreases toward the second threshold voltage. At t6, redox flow battery idle conditions are no longer met. As such, redox flow battery heater is adjusted to heat redox flow battery to a temperature greater than or equal to the second threshold battery temperature. The electrolyte pump is reactivated and is set to a flow rate substantially equal to the threshold charging/discharging flow rate. Lastly, the power module voltage begins to increase to a voltage higher than the second threshold voltage. This is further indicated by the DC current moving to a positive position, wherein an external source is flowing current to the redox flow battery. In this way, redox flow battery is in the charge mode and has exited the idle mode.

Thus, an example of a redox flow battery system may include a power module, including a plurality of redox flow battery cell stacks, each of the redox flow battery cell stacks including a redox flow battery cell; an electrolyte pump capable of delivering electrolyte from an electrolyte tank to the power module; and a power control system with a controller, including executable instructions thereon to, switch the redox flow battery system to an idle mode, wherein the idle mode includes operation of the redox flow battery system outside of a charging mode and outside of a discharge mode, in response to switching to the idle mode, repeatedly cycling operation of the electrolyte pump between an idling threshold flow rate less than a charging threshold flow rate and a deactivation threshold flow rate, and in response to switching to the charging mode, maintaining operation of the electrolyte pump at the charging threshold flow rate. A second example of the redox flow battery system may optionally include the first example, and further includes a heater thermally coupled to the electrolyte, wherein the executable instructions include reducing an electrolyte temperature to an idling threshold temperature in response to switching to the idle mode. A third example of the redox flow battery system may optionally include one or more of the first and second examples, and further includes wherein the idling threshold temperature is increased in response to an anticipated load demand of the redox flow battery system being higher, and the idling threshold temperature decreased in response to the anticipated load demand of the redox flow battery system being lower. A fourth example of the redox flow battery system may optionally include one or more of the first through third examples, and further includes wherein power electronics are deactivated in response to switching to the idle mode. A fifth example of the redox flow battery system may optionally include one or more of the first through fourth examples, and further includes wherein the idling threshold temperature corresponds to a temperature below which electrolyte precipitation occurs. A sixth example of the redox flow battery system may optionally include one or more of the first through fifth examples, and further includes wherein the idling threshold temperature is less than an electrolyte temperature during the charging and discharge modes.

In this way, a redox flow battery comprises a routine for cycling an electrolyte pump between on and off positions based on one or more of a time elapsed and a power module voltage during a redox flow battery idle mode. In one example, the electrolyte pump is activated in response to the power module voltage falling below a first threshold voltage. Additionally or alternatively, the electrolyte pump is activated in response to a first timer exceeding a first threshold duration, where the first timer measures an amount of time the electrolyte pump is deactivated during the redox flow battery idle mode. At any rate, the electrolyte pump is activated to a flow rate less than an electrolyte pump flow rate outside of the redox flow battery idle mode. The technical effect of activating the electrolyte pump to a decreased flow rate and cycling the pump between on and off positions is to decrease parasitic power losses due to the pump and to decrease power capacity losses experienced by the redox flow battery due to shunting.

Note that the example control and estimation routines included herein can be used with various battery and/or vehicle system configurations. The control methods and routines disclosed herein may be stored as executable instructions in non-transitory memory and may be carried out by the control system including the controller in combination with the various sensors, actuators, and other battery hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the redox flow battery control system, where the described actions are carried out by executing the instructions in a system including the various battery hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a redox flow battery system, the method comprising:
    switching the redox flow battery system to an idle mode, wherein the idle mode includes operation of the redox flow battery system outside of a charging mode and outside of a discharge mode,
    in response to switching to the idle mode,
        repeatedly cycling operation of an electrolyte pump between an idling threshold flow rate less than a charging threshold flow rate and a deactivation threshold flow rate, each of the idling threshold flow rate and the deactivation threshold flow rate being non-zero, and
    in response to switching to the charging mode,
        maintaining operation of the electrolyte pump at the charging threshold flow rate greater than the idling threshold flow rate.

2. The method of claim 1, further comprising, in response to switching to the discharge mode, maintaining operation of the electrolyte pump at a discharge threshold flow rate greater than the idling threshold flow rate.

3. The method of claim 2, wherein operation of the electrolyte pump at the deactivation threshold flow rate is maintained for at least a first threshold duration, operation of the electrolyte pump at the idling threshold flow rate is maintained for at least a second threshold duration, and the first threshold duration is greater than the second threshold duration.

4. The method of claim 3, wherein the second threshold duration is less than 20% of the first threshold duration.

5. The method of claim 4, wherein the idling threshold flow rate is adjusted higher in response to an anticipated load demand of the redox flow battery system being higher, and the idling threshold flow rate is adjusted lower in response to the anticipated load demand of the redox flow battery system being lower.

6. The method of claim 5, wherein the first threshold duration is adjusted lower in response to the anticipated load demand of the redox flow battery system being higher, and the first threshold duration is adjusted higher in response to the anticipated load demand of the redox flow battery system being lower.

7. The method of claim 6, wherein the second threshold duration is adjusted higher in response to the anticipated load demand of the redox flow battery system being higher, and the second threshold duration is adjusted lower in response to the anticipated load demand of the redox flow battery system being lower.

8. A method of operating a redox flow battery system, the method comprising:
    operating the redox flow battery system in an idle mode during a condition when the redox flow battery system is operating outside of a charging mode and outside of a discharge mode while a DC current remains zero;
    during operation in the idle mode, repeatedly cycling operation of at least one electrolyte pump between an active state and an inactive state, wherein the active state comprises pumping electrolyte at an idling threshold flow rate less than a charging threshold flow rate, and the inactive state comprises deactivating the at least one electrolyte pump;
    in response to switching to the discharge mode, maintaining operation of the at least one electrolyte pump at a discharge threshold flow rate; and
    in response to switching to the charging mode, maintaining operation of the at least one electrolyte pump at the charging threshold flow rate,
    wherein cycling operation of the at least one electrolyte pump between the active state and the inactive state includes, switching from the active state to the inactive state in response to a power module voltage increasing above a second threshold voltage, and switching from the inactive state to the active state in response to the power module voltage decreasing below a first threshold voltage, the first threshold voltage being less than the second threshold voltage.

9. The method of claim 8, wherein the idling threshold flow rate is adjusted higher in response to an anticipated load demand of the redox flow battery system being higher, and the idling threshold flow rate is adjusted lower in response to the anticipated load demand of the redox flow battery system being lower.

10. The method of claim 9, wherein the first threshold voltage is adjusted higher in response to the anticipated load demand of the redox flow battery system being higher, and the first threshold voltage is adjusted lower in response to the anticipated load demand of the redox flow battery system being lower.

11. The method of claim 10, wherein the second threshold voltage is adjusted higher in response to the anticipated load demand of the redox flow battery system being higher, and the second threshold voltage is adjusted lower in response to the anticipated load demand of the redox flow battery system being lower.

12. A redox flow battery system, comprising:
    a power module, including a plurality of redox flow battery cell stacks, each of the plurality of redox flow battery cell stacks including a respective redox flow battery cell having a positive electrolyte chamber and a negative electrolyte chamber;

an electrolyte pump capable of delivering electrolyte from an electrolyte tank to the power module;

and a power control system with a controller including instructions thereon, the instructions executable to:

switch the redox flow battery system to an idle mode, wherein the idle mode includes operation of the redox flow battery system outside of a charging mode and outside of a discharge mode, in response to switching to the idle mode, repeatedly cycle operation of the electrolyte pump between an idling threshold flow rate less than a charging threshold flow rate and a deactivation threshold flow rate, each of the idling threshold flow rate and the deactivation threshold flow rate being non-zero, and, in response to switching to the charging mode, maintain operation of the electrolyte pump at the charging threshold flow rate, and flow electrolyte unequally to the positive and negative electrolyte chambers of each respective redox flow battery cell of the plurality of redox flow battery cell stacks.

13. The system of claim 12, further comprising a heater thermally coupled to the electrolyte, wherein the instructions are further executable to reduce an electrolyte temperature to an idling threshold temperature in response to switching to the idle mode.

14. The system of claim 13, wherein the idling threshold temperature is increased in response to an anticipated load demand of the redox flow battery system being higher, and the idling threshold temperature is decreased in response to the anticipated load demand of the redox flow battery system being lower.

15. The system of claim 14, wherein power electronics are deactivated in response to switching to the idle mode.

16. The system of claim 15, wherein the idling threshold temperature corresponds to a temperature below which electrolyte precipitation occurs.

17. The system of claim 16, wherein the idling threshold temperature is less than the electrolyte temperature during the charging and discharge modes.

18. The method of claim 8, wherein deactivating the at least one electrolyte pump comprises deactivating a sufficient number of electrolyte pumps to stop circulation of electrolyte to and from redox flow battery cells of the redox flow battery system.

* * * * *